United States Patent [19]
Westrom

[11] 3,916,258
[45] Oct. 28, 1975

[54] FUSE HOLDER ASSEMBLY

[75] Inventor: Arthur Clifford Westrom, Stone Mountain, Ga.

[73] Assignee: Kuhlman Corporation, Troy, Mich.

[22] Filed: Apr. 8, 1974

[21] Appl. No.: 459,171

[52] U.S. Cl. ............... 317/15; 317/14 C; 317/14 F; 337/208
[51] Int. Cl.² ..................... H02H 7/04; H02H 5/06
[58] Field of Search ........ 317/15, 14 R, 14 C, 14 H, 317/40 A; 337/144, 145, 162, 207, 208, 186, 204, 229, 231

[56] References Cited
UNITED STATES PATENTS

| | | | |
|---|---|---|---|
| 2,662,947 | 12/1953 | Kyle, Jr. | 337/144 X |
| 2,663,825 | 12/1953 | Amundson | 317/15 |
| 3,210,604 | 10/1965 | Nelson | 317/15 |
| 3,365,616 | 1/1968 | Hermann | 317/15 |
| 3,588,606 | 6/1971 | Ristuccia | 317/15 |
| 3,666,992 | 5/1972 | Goodman | 317/15 |

Primary Examiner—J. D. Miller
Assistant Examiner—Patrick R. Salce
Attorney, Agent, or Firm—Everett R. Casey

[57] ABSTRACT

A fuse holder assembly which is particularly adapted to be utilized in conjunction with the protection system for the primary side of an oil-filled transformer assembly, wherein the fuse holder is mounted on a plate, the plate being supported on the face of the transformer casing. The fuse holder extends from the plate through an aperture in the transformer housing to support the fusing elements below the level of the cooling liquid within the transformer housing. The fusing elements are a current limiting fuse and a weaklink fuse which are mechanically supported by the fuseholder and which can both be withdrawn from the transformer casing with the fuseholder, to permit inspection and replacement.

11 Claims, 2 Drawing Figures

FUSE HOLDER ASSEMBLY

CASE REFERENCE

This invention is related to those of U.S. Pat. No. 3,699,490 granted Oct. 17, 1972, and of U.S. Pat. No. 3,701,926 granted Oct. 31, 1972, and is further related to those in the U.S. patent application of Arthur C. Westrom, John L. Fisher and Peter Mayer, Ser. No. 459,172, entitled "Fuse Holder Assembly" and the U.S. patent application of Peter Mayer and William H. Russell, Ser. No. 459,123, entitled "Fuse Holder Assembly", both filed on Apr. 8, 1974.

BRIEF SUMMARY OF THE INVENTION

This invention relates to an improved mechanism for electrically fusing liquid cooled electrical induction equipment such as power and distribution transformers. The invention is of particular usefulness in protecting pole type, pad mounted and underground oil-filled distribution transformers. For protection under a wide range of fault conditions, the combination of an oil-immersible current limiting fuse and an oil-immersible weaklink fuse, of commercially available types, is supported internally of the transformer housing and immersed in the liquid coolant within that housing, and in the preferred use, the fuses are serially connected with the primary windings of the transformer. Since the weaklink fuse responds to oil temperature, it reacts to secondary loads and faults, and as a result the oil immersed combination can provide secondary fault control, high-emergency internal fault control, overload control, tank temperature control, and oil temperature control.

The fuse combination is mounted on a fuse holder member which controls its immersed position relative to the other components of the transformer. The fuse holder and fuse combination can be withdrawn through a normally covered access opening in the transformer housing for field inspection and replacement of one or both of the fuses.

DETAILED DESCRIPTION

Figure 1:
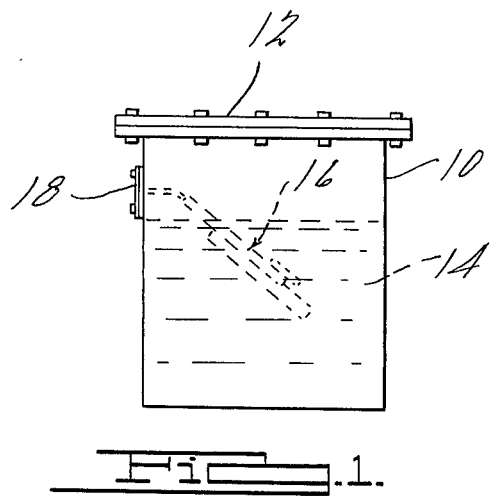
FIG. 1 is an elevated view of a transformer assembly illustrating the use of the fuse holder assembly embodying the principles of the present invention.

The transformer of FIG. 1 includes a housing including a casing 10 closed by a cover 12 bolted or otherwise secured thereon. The transformer, which is conventional, includes internal components including primary and secondary windings (not shown) immersed in a suitable dielectric coolant such as oil 14. A fuse holder assembly 16 is majorly immersed in the coolant 14 and terminates in a plate 18 which is bolted or otherwise removably secured to the transformer housing, such as to the wall of casing 10, in sealing overlying relation to an access opening therein. The opening, which is above the coolant level, is large enough to permit the fuse assembly 16 to be withdrawn therethrough, but is smaller than plate 18 so as to be sealed thereby.

The fuse holder assembly includes a fuse holder member having an elongated, channel-shaped member 20 bolted or otherwise secured to an angled ribbon or strap portion 22. The remote end of portion 22 is in turn welded or otherwise secured to the control portion of the inner face of the plate 18.

Current limiting fuse 24 and weaklink fuse 28 are both firmly but removably secured to member 20, as by hand operated or snap-action clamps 26 and 30. In the illustrated arrangement, the two fuses are mounted with their longitudinal axes in spaced parallelism with one another and in spaced parallelism with the longitudinal axes of the member 20, although an in-line or co-axial relationship is also contemplated.

Figure 2:
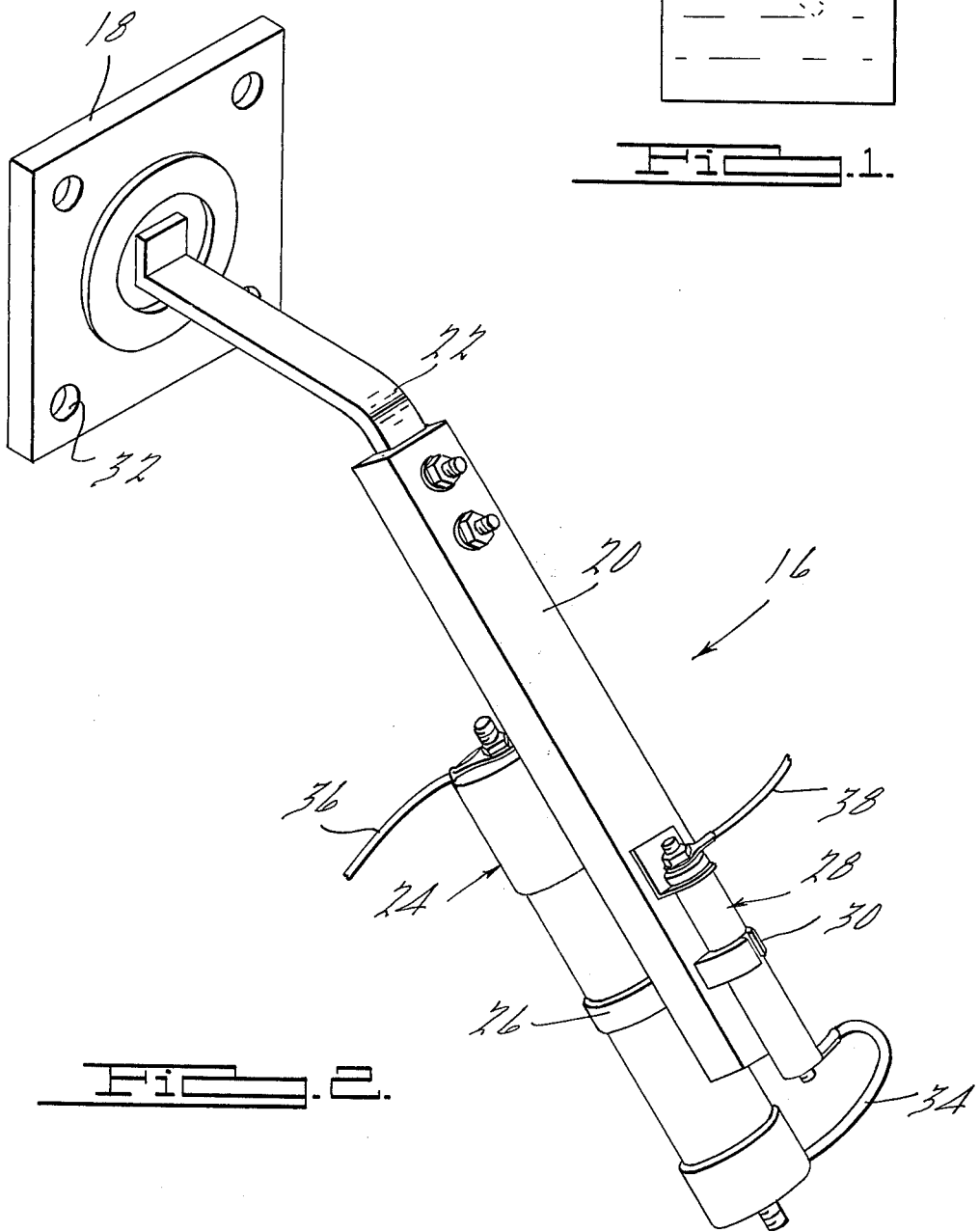
FIG. 2 is a perspective view of the fuse holder assembly used in the transformer of FIG. 1.

The smaller weaklink fuse 28 is illustrated in FIG. 2, to longitudinally overlap the length of current limiting fuse 24, and in fact is shown to be fully overlapped by the longer fuse 24. The representatively circular opening in the tank housing is large enough to permit the concurrent passage therethrough of the member 20 and the fuses 24 and 28 mounted thereon, but is smaller than the circle defined by the inner faces of the bolt or stud accepting holes 32 in plate 18.

In the illustrated arrangement, fuse 24 is mounted on the open-channel face of member 26 so as to be, to a degree, nested therein. Other mounting arrangements are contemplated.

A jumper wire 34 interconnects the lower terminals of the fuses 24 and 28, a lead 36 connects the upper terminal of current limiting fuse 24 to the line terminal or bushing on the transformer (to the source of power), and a lead 38 connects the upper terminal of the weaklink fuse 28 to the transformer primary coil or winding, to establish a series interconnection of the fuses in the primary side. Leads 36 and 38 are sufficiently long to permit the assembly to be withdrawn from the transformer housing through the opening therein. The alternative use of snap contacts is also contemplated.

To service the fuses, plate 18 is unbolted and withdrawn, pulling the assembly through the opening in the housing. After inspection and any necessary fuse replacement, the assembly is reinserted through the opening to its proper position and plate 18 is resecured in place.

Current limiting fuse 24 and weaklink fuse 28 may be of any suitable, appropriately rated, commercially available types such as those manufactured by Kearney-National Inc.

In general, current limiting fuses perform well on high current faults but under some circumstances can tend to perform less satisfactorily in the low-current region, tending to overheat, with extended-duration low-current fault conditions, to the possible point of blowing up. The weaklink fuses, on the other hand, while less satisfactory on high fault currents, performs well under low-current fault conditions. Accordingly, a co-ordinated series combination of the two can provide highly improved full-range fault protection.

What is claimed is:

1. In a transformer assembly having a housing having a line terminal, a winding assembly supported in the housing, and a cooling liquid within the housing for cooling the winding, the combination of means defining a separate fuse assembly accepting opening in said housing above the level of the cooling liquid and spaced from the line terminal, closure means removably attached to said housing for closing said opening, a fuse holder member, first securing means on said fuse holder member for removably securing thereon a current limiting fuse, second securing means on said fuse holder member for removably securing thereon a separate weaklink fuse, said first and second securing means permitting separate replacement of the current limiting fuse and of the weaklink fuse, means for electrically interconnecting the current limiting fuse and the weaklink fuse, means for supporting said fuse holder member with respect to said housing and adjacent said opening with a portion thereof, including the current limiting fuse and the weaklink fuse, below the surface level of and immersed in the cooling liquid, and means for permitting withdrawal of said fuse holder member with the current limiting and weaklink fuses thereof from said housing through said opening.

2. The combination of claim 1 in which said means for supporting includes said closure means and means securing said fuse holder member to said closure means, and in which said means for permitting withdrawal includes said removably attachable closure means.

3. The combination of claim 1 further including electrical means for connecting the interconnected current limiting fuse and weaklink fuse in series between a line source and the coils while permitting said fuse holder with the current limiting and weaklink fuses thereon to be withdrawn from said housing through said opening.

4. The combination of claim 3 in which said electrical means includes an electrical conductor extending to the line terminal, said conductor being of sufficient length to be extendable from the line terminal to and through the opening in the housing.

5. The combination of claim 1 in which the portion of said fuse holder member to which the current limiting and weaklink fuses is secured, is elongated and has a longitudinal axis, in which each of the current limiting and weaklink fuses is elongated and has a longitudinal axis, and in which each of the current limiting and weaklink fuses is mounted on said fuse holder member with the longitudinal axis of each thereof extending in substantial parallelism with the longitudinal axis of said elongated portion of said fuse holder member.

6. The combination of claim 5 in which the longitudinal axis of the weaklink fuse is laterally spaced from the longitudinal axis of the current limiting fuse.

7. The combination of claim 6 in which the longitudinal axis of the weaklink fuse is laterally spaced from the longitudinal axis of said elongated portion of said fuse holder member.

8. The combination of claim 7 in which the longitudinal axis of the current limiting fuse is laterally spaced from the longitudinal axis of said elongated portion of said fuse holder member.

9. The combination of claim 6 in which the current limiting and weaklink fuses are disposed laterally of one another and in which said opening in the transformer accommodates the concurrent withdrawal therethrough of said fuse holder member and said laterally disposed current limiting and weaklink fuses.

10. The combination of claim 5 in which said portion of said fuse holder member includes a cavity for nesting one of the fuses.

11. In a transformer assembly having a housing having a line terminal, a winding assembly supported in the housing, and a cooling liquid within the housing for cooling the winding, the combination of means defining a separate fuse assembly accepting opening in said housing above the level of the cooling liquid and spaced from the line terminal, closure means removably attached to said housing for closing said opening, a fuse holder member, a current limiting fuse, first securing means on said fuse holder member for removably securing thereon said current limiting fuse, a weaklink fuse separate from said current limiting fuse, second securing means on said fuse holder member for removably securing thereon said separate weaklink fuse, said first and second securing means permitting separate replacement of said current limiting fuse and of said weaklink fuse, means for electrically interconnecting said current limiting fuse and said weaklink fuse, means for supporting said fuse holder member with respect to said housing and adjacent said opening with a portion thereof, including said current limiting fuse and said weaklink fuse, below the surface level of and immersed in the cooling liquid, and means for permitting withdrawal of said fuse holder member with said current limiting and weaklink fuses thereon from said housing through said opening.

* * * * *